United States Patent
Matsueda et al.

(10) Patent No.: US 7,625,836 B2
(45) Date of Patent: Dec. 1, 2009

(54) HEAT-RESISTANT OXIDE

(75) Inventors: Satoshi Matsueda, Shizuoka (JP);
Mareo Kimura, Shizuoka (JP); Naoto Miyoshi, Shizuoka (JP); Yoshinori Ishii, Shizuoka (JP); Hirohisa Tanaka, Shiga (JP); Isao Tan, Shiga (JP); Mari Uenishi, Shiga (JP); Masashi Taniguchi, Shiga (JP)

(73) Assignees: Cataler Corporation, Shizuoka (JP); Daihatsu Motor Co., Ltd., Osaka (JP)

( * ) Notice: Subject to any disclaimer, the term of this patent is extended or adjusted under 35 U.S.C. 154(b) by 188 days.

(21) Appl. No.: 11/792,832

(22) PCT Filed: Dec. 13, 2005

(86) PCT No.: PCT/JP2005/022885

§ 371 (c)(1),
(2), (4) Date: Jun. 12, 2007

(87) PCT Pub. No.: WO2006/064809

PCT Pub. Date: Jun. 22, 2006

(65) Prior Publication Data

US 2007/0297971 A1 Dec. 27, 2007

(30) Foreign Application Priority Data

Dec. 15, 2004 (JP) ............... 2004-363147

(51) Int. Cl.
| | |
|---|---|
| B01J 21/00 | (2006.01) |
| B01J 21/02 | (2006.01) |
| B01J 21/06 | (2006.01) |
| B01J 21/10 | (2006.01) |
| B01J 23/00 | (2006.01) |
| B01J 23/02 | (2006.01) |
| B01J 23/10 | (2006.01) |
| B01J 23/38 | (2006.01) |
| B01J 23/40 | (2006.01) |
| B01J 23/42 | (2006.01) |
| B01J 23/44 | (2006.01) |
| B01J 23/54 | (2006.01) |
| B01J 23/56 | (2006.01) |
| B01J 23/58 | (2006.01) |
| B01J 23/63 | (2006.01) |
| B01J 37/08 | (2006.01) |
| C01F 3/00 | (2006.01) |
| C01F 5/00 | (2006.01) |
| C01F 7/00 | (2006.01) |
| C01F 11/00 | (2006.01) |
| C01F 17/00 | (2006.01) |
| C01G 25/00 | (2006.01) |
| C01G 25/02 | (2006.01) |
| C01G 55/00 | (2006.01) |
| C01G 57/00 | (2006.01) |

(52) U.S. Cl. ............ 502/325; 502/302; 502/303; 502/328; 502/332; 502/333; 502/334; 502/339; 502/340; 502/341; 502/349; 423/592.1; 423/593.1; 423/594.12; 423/594.16; 423/600; 423/608

(58) Field of Classification Search ............ 502/302, 502/303, 325, 328, 332–334, 339–341, 349; 423/592.1, 593.1, 594.12, 594.16, 600, 608
See application file for complete search history.

(56) References Cited

U.S. PATENT DOCUMENTS

| | | | | |
|---|---|---|---|---|
| 4,192,907 | A | * | 3/1980 | Jalan et al. ............ 429/40 |
| 5,837,642 | A | * | 11/1998 | Tanaka et al. ............ 502/304 |
| 6,576,200 | B1 | | 6/2003 | Yamamoto et al. |
| 7,205,257 | B2 | * | 4/2007 | Tanaka et al. ............ 502/327 |
| 2005/0215428 | A1 | * | 9/2005 | Matsueda et al. .......... 502/328 |

FOREIGN PATENT DOCUMENTS

| | | |
|---|---|---|
| JP | 8-217461 | 8/1996 |
| JP | 2000-72447 | 3/2000 |
| JP | 2000-262898 | 9/2000 |
| JP | 2002-282692 | 10/2002 |

\* cited by examiner

*Primary Examiner*—Timothy C Vanoy
*Assistant Examiner*—Serena L Hanor
(74) *Attorney, Agent, or Firm*—Jean C. Edwards, Esq.; Akerman Senterfitt

(57) ABSTRACT

To provide a heat-resistant oxide which is excellent in heat resistance and durability at high temperature and has high activity, a heat-resistant oxide which has an oxide crystal structure and in which a rate of a solid solution of a noble metal in the oxide crystal structure is 50% or more is obtained by heat-treating (secondarily baking) a precursor composition comprising zirconia, at least one coordinative element selected from the group consisting of rare earth elements, alkaline earth elements, aluminum and silicon, and at least one noble metal selected from the group consisting of platinum, rhodium and palladium at 650° C. or higher.

9 Claims, No Drawings

HEAT-RESISTANT OXIDE

CROSS-REFERENCE TO RELATED APPLICATIONS

This application is a 35 U.S.C. 371 national stage entry of PCT/JP2005/022885, filed Dec. 13, 2005, and claims priority from Japanese Patent Application No. 2004-363147, filed Dec. 15, 2004, the contents of which are herein incorporated by reference in their entirety.

TECHNICAL FIELD

The present invention relates to a heat-resistant oxide which is used as a reaction catalyst for a vapor phase or a liquid phase.

BACKGROUND ART

As a three-way catalyst which can simultaneously clean up carbon monoxides (CO), hydrocarbons (HC) and nitrogen oxides ($NO_x$) contained in an exhaust gas, noble metals such as Pt (platinum), Rh (rhodium) and Pd (palladium) have widely been used as a catalytically active component.

For example, there is proposed an exhaust gas purifying catalyst in which after an yttria (Y)-zirconia (Zr) composite oxide is obtained, an aqueous dinitrodiammine platinum solution is added to the composite oxide and then evaporated to dryness to support platinum (Pt) on the composite oxide (see, for example, following Patent Document 1).

Patent Document 1: Japanese Unexamined Patent Publication No. 2000-262898)

DISCLOSURE OF THE INVENTION

Problems to be Solved by the Invention

The exhaust gas purifying catalyst described in Patent Document 1 has a drawback that Pt is supported on the surface of a Y—Zr composite oxide and Pt accordingly shows a low rate of a solid solution in the Y—Zr composite oxide, so that the exhaust gas purifying catalyst cannot suppress grain growth of Pt and cannot prevent a decrease in catalytic activity when used under conditions at high temperature over a long period of time.

An object of the present invention is to provide a heat-resistant oxide which is excellent in heat resistance and durability at high temperature and has high activity.

Solution to the Problems

The heat-resistant oxide of the present invention wherein a rate of a solid solution of a noble metal in an oxide crystal structure comprising zirconia, at least one coordinative element selected from the group consisting of rare earth elements, alkaline earth elements, aluminum and silicon, and at least one noble metal selected from the group consisting of platinum, rhodium and palladium is 50% or more.

In the heat-resistant oxide of the present invention, the oxide crystal structure is preferably a fluorite-type crystal structure.

The heat-resistant oxide of the present invention is represented by the following general formula (1):

$$Zr_{1-(x+y)}A_xN_yO_{2-z} \qquad (1)$$

wherein A represents at least one coordinative element selected from the group consisting of rare earth elements, alkaline earth elements, aluminum and silicon; N represents at least one noble metal selected from the group consisting of platinum, rhodium and palladium; x represents an atomic ratio of A satisfying the following relation: 0.01<x<0.4; y represents an atomic ratio of N satisfying the following relation: 0.0001<y<0.02; and z represents an oxygen deficiency.

In the heat-resistant oxide of the present invention, the rare earth element is preferably a rare earth element whose valence does not vary from 3.

In the heat-resistant oxide of the present invention, the rare earth element is preferably at least one selected from the group consisting of La, Nd and Y.

In the heat-resistant oxide of the present invention, the coordinative element is preferably the rare earth element.

In the heat-resistant oxide of the present invention, the coordinative element is preferably selected from elements other than Ce.

In the heat-resistant oxide of the present invention, the noble metal is preferably Rh and/or Pt.

In the heat-resistant oxide of the present invention, the noble metal is preferably Rh.

In the heat-resistant oxide of the present invention, the rate of the solid solution is preferably 80% or more.

The heat-resistant oxide of the present invention is preferably obtained by mixing a noble metal material containing the noble metal with a zirconia material containing zirconia and a coordinative element material containing the coordinative element and heat-treating the resulting mixture.

The heat-resistant oxide of the present invention is preferably obtained by heat-treating a precursor composition containing the zirconia, the coordinative element and the noble metal at 650° C. or higher.

The heat-resistant oxide of the present invention can maintain catalytic activity of a noble metal at a high level even when exposed under an atmosphere at high temperature. Therefore, when such a heat-resistant oxide is used as an exhaust gas purifying catalyst, an excellent exhaust gas purifying performances can be realized.

BEST MODE FOR CARRYING OUT THE INVENTION

The heat-resistant oxide of the present invention has an oxide crystal structure including zirconia, at least one coordinative element selected from the group consisting of rare earth elements, alkaline earth elements, aluminum and silicon, and at least one noble metal selected from the group consisting of platinum, rhodium and palladium, and the noble metal dissolves in the heat-resistant oxide having an oxide crystal structure to form a solid solution.

Such a heat-resistant oxide is represented, for example, by the following general formula (1):

$$Zr_{1-(x+y)}A_xN_yO_{2-z} \qquad (1)$$

wherein A represents at least one coordinative element selected from the group consisting of rare earth elements, alkaline earth elements, aluminum and silicon; N represents at least one noble metal selected from the group consisting of platinum, rhodium and palladium; x represents an atomic ratio of A satisfying the following relation: 0.01<x<0.4; y represents an atomic ratio of N satisfying the following relation: 0.0001<y<0.02; and z represents an amount of oxygen deficiency.

Examples of the rare earth element represented by A in the general formula (1) include rare earth elements whose valence does not vary from 3, such as Sc (scandium), Y (yttrium), La (lanthanum), Nd (neodymium), Pm (promethium), Gd (gadolinium), Dy (dysprosium), Ho (holmium), Er (erbium) and Lu (lutetium); rare earth elements whose valence varies to 3 or 4, such as Ce (cerium), Pr (praseodymium) and Tb (terbium); and rare earth elements whose valence varies to 2 or 3, such as Sm (samarium), Eu (europium), Tm (thulium) and Yb (ytterbium), of which the rare earth elements whose valence does not vary from 3 are preferred, and La, Nd and Y are more preferred. These rare earth elements can be used alone or in combination.

Examples of the alkaline earth metal represented by A in the general formula (1) are Be (beryllium), Mg (magnesium), Ca (calcium), Sr (strontium), Ba (barium) and Ra (radium), of which Ca, Sr and Ba are preferred. Each of these alkaline earth elements can be used alone or in combination.

Examples of the coordinative element represented by A in the general formula (1) are preferably rare earth elements and are also preferably elements other than Ce (cerium). Each of these coordinative elements can be used alone or in combination.

Examples of the noble metal represented by N in the general formula (1) are Pt (platinum), Rh (rhodium) and Pd (palladium), of which Rh and Pd are preferred and Rh is more preferred. Each of these noble metals can be used alone or in combination.

Further, x represents an atomic ratio of A satisfying the following relation: $0.01<x<0.4$, and preferably satisfying the following relation: $0.05<x<0.2$.

Further, y represents an atomic ratio of N satisfying the following relation: $0.0001<y<0.02$, and preferably satisfying the following relation: $0.0001<y<0.008$.

The amount z represents an oxygen deficiency which in turn means a ratio of vacancies formed in an oxide crystal structure.

In the heat-resistant oxide of the present invention, the noble metal dissolves in the heat-resistant oxide having the oxide crystal structure to form a solid solution. When the noble metal dissolves in the heat-resistant oxide to form a solid solution, grain growth of the noble metal is suppressed and thus heat resistance and excellent durability at high temperature can be realized.

A rate of a solid solution of a noble metal in a heat-resistant oxide having an oxide crystal structure means a molar ratio of the noble metal dissolved to form a solid solution with respect to a total amount of the noble metal, that is, the total amount of the noble metal to be supported on the surface described later and the noble metal dissolved to form a solid solution. The rate of a solid solution is, for example, 50% or more, and preferably 80% or more. When the rate of a solid solution is less than 50%, it is sometimes impossible to effectively suppress grain growth of the noble metal when used under an atmosphere at high temperature over a long period of time.

In the measurement of the rate of a solid solution of the noble metal in the heat-resistant oxide, ICP atomic emission spectroscopy described later can be used.

In the heat-resistant oxide of the present invention, the oxide crystal structure is preferably a cubic or tetragonal fluorite-type crystal structure.

The heat-resistant oxide of the present invention can be obtained by mixing a noble metal material containing a noble metal with a zirconia material containing zirconia and a coordinative element material containing a coordinative element, and heat-treating (secondarily baking) the mixture. More specifically, the heat-resistant oxide can be obtained by heat-treating (secondarily baking) a precursor composition containing zirconia, a coordinative element and a noble metal.

The method for producing a heat-resistant oxide is not specifically limited and examples thereof include are conventionally known methods for producing a heat-resistant oxide, such as coprecipitation method, citrate complex method and alkoxide method.

According to the coprecipitation method, an aqueous mixed salt solution containing salts (a zirconia material and a coordinative element material) (hereinafter referred to as "salts of respective elements") of Zr and a coordinative element (hereinafter referred to as "respective elements") in the predetermined stoichiometric ratio is prepared and the resulting aqueous mixed salt solution is added to a neutralizer to form a coprecipitate. The resulting coprecipitate is dried, heat treated (primarily baked) and mixed with a solution containing salts of noble metal (a noble metal material), thereby supporting the noble metal to obtain a precursor composition. The resulting precursor composition is then heat treated (secondarily baked) to obtain a heat-resistant oxide.

Alternatively, in the coprecipitation method, an aqueous mixed salt solution containing Zr, a coordinative element and a salt of noble metal can be prepared and the resulting aqueous mixed salt solution is coprecipitated by adding a neutralizing agent to obtain a precursor composition. Then, the resulting precursor composition is dried and heat treated to obtain a heat-resistant oxide.

Examples of the salts of the respective elements are inorganic salts such as sulfates, nitrates, chlorides and phosphates; and organic acid salts such as acetates and oxalates. The aqueous mixed salt solution can be prepared, for example, by adding the salts of the respective elements to water so as to establish the stoichiometric ratio and mixing them with stirring.

Then, the aqueous mixed salt solution is coprecipitated by being added to a neutralizing agent. Examples of the neutralizing agent are ammonia; organic bases including amines such as triethylamine and pyridine; and inorganic bases such as sodium hydroxide, potassium hydroxide, sodium carbonate, potassium carbonate, and ammonium carbonate. The neutralizing agent is added to the aqueous mixed salt solution so that the resulting solution has a pH of about 6 to about 10.

The resulting coprecipitate is optionally washed with water and filtered, and dried by vacuum drying or forced-air drying, for example, and then heat treated (primarily baked) at 300° C. to 1,200° C., preferably 650° C. to 1,100° C., and more preferably 800° C. to 1,000° C., for 1 to 48 hours.

Then, the heat treated (primarily baked) coprecipitate was impregnated with a noble metal salt solution containing a salt of noble metal (a noble metal material) in the predetermined stoichiometric ratio by mixing, thereby supporting the salt of noble metal (a noble metal material) to obtain a precursor composition.

Examples of the salt of noble metal are inorganic salts such as sulfates, nitrates, chlorides and phosphates; and organic acid salts such as acetates and oxalates. Solutions containing the above-listed salts can be used as the noble metal salt solution. Practical examples thereof are aqueous nitrate solutions, aqueous dinitrodiammine nitrate solutions and aqueous chloride solutions. More specific examples are rhodium salt solutions such as rhodium nitrate solution and rhodium chloride solution; palladium salt solutions such as nitrate palladium solution and palladium chloride solution; and platinum salt solutions such as dinitrodiammine platinum nitrate solution, platinum chloride solution and platinum tetraammine solution. These noble metal salt solutions may be used alone or in combination.

The method of supporting noble metal on the heat treated (primarily baked) coprecipitate is not specifically limited and a known method can be used. For example, the above-described noble metal salt solution is prepared and the noble metal salt solution is added to heat treated (primarily baked) coprecipitate, thereby impregnating the coprecipitate with the noble metal salt solution while mixing for 0.5 to 12 hours, and thus noble metal is supported. The amount of the noble metal to be supported on the coprecipitate is, for example, 20 parts by weight or less, and preferably from 0.1 to 10 parts by weight, based on 100 parts by weight of the coprecipitate.

The resulting precursor composition is then heat treated (secondarily baked) to obtain a heat-resistant oxide. To subject the precursor composition to a heat treatment (secondary baking), the precursor composition is dried, for example, at a temperature of 50° C. to 200° C. for 1 to 48 hours and further heat treated (secondarily baked) at a temperature of 300° C. to 1,200° C., preferably 650° C. to 1,100° C., and more preferably 800° C. to 1,000° C., for 1 to 48 hours. When the heat treatment (secondary baking) temperature is lower than the above range, a rate of a solid solution may be less than 50%. On the other hand, the heat treatment (secondary baking) temperature is higher than the above range, the rate of a solid solution is within the above range. However, the noble metal may deteriorate and catalytic activity may decrease.

According to the citrate complex method, an aqueous citrate-mixed salt solution containing citric acid and salts of the respective elements is prepared by adding a citric acid salt solution having slightly excess stoichiometric ratio to the respective elements. The aqueous citrate-mixed salt solution is evaporated to dryness to form a citrate complex of the above-described respective elements. The obtained citrate complex are provisionally baked and heat treated (primarily baked) to obtain powders containing Zr and coordinative elements.

Then, a solution containing salt of noble metal (a noble metal material) is mixed in the powders and the noble metal is supported by the powders to obtain a precursor composition. The resulting precursor composition is then heat treated (secondarily baked) to obtain a heat-resistant oxide.

Alternatively in the citrate complex method, an aqueous citrate-mixed salt solution containing Zr, coordinative elements and a salt of a noble metal can be prepared and the aqueous citrate-mixed salt solution is evaporated to dryness to form a citrate complex of Zr, coordinative elements and a noble metal, and thus a precursor composition is obtained. A heat-resistant oxide can also be obtained by provisionally baking the precursor composition, followed by a heat treatment.

The salts of the respective elements can be the same salts as listed above. The aqueous citrate-mixed salt solution is prepared by preparing an aqueous mixed salt solution by the procedure of the above method and adding an aqueous solution of citric acid to the aqueous mixed salt solution.

The aqueous citrate-mixed salt solution is then evaporated to dryness to form a citrate complex of the above-described respective elements. The evaporation to dryness is carried out at a temperature at which the formed citrate complex is not decomposed, for example, at room temperature to about 150° C., thereby removing fluids. Consequently, the above-mentioned citrate complex of the above-described respective elements can be formed.

The citrate complex thus formed is provisionally baked and subjected to a heat treatment (primary baking). The heat treatment (primary baking) may be carried out by heating at a temperature of 250° C. to 350° C. for 1 to 12 hours in vacuum or under inert gases atmosphere. Then, the citrate complex is subjected to a heat treatment (primary baking) at a temperature of 300° C. to 1,200° C. for 1 to 48 hours, preferably 650° C. to 1,100° C., and more preferably 800° C. to 1,000° C., to obtain powders containing a zirconia material and a coordinative element material.

Then, a noble metal salt solution is added to powders containing a zirconia material and a coordinative element material by the same procedure as in the coprecipitation method, thereby impregnating the powders with the solution while mixing a salt of noble metal (a noble metal material) to obtain a precursor composition.

The resulting precursor composition is subjected to a heat treatment (secondary baking) by the same procedure as in the coprecipitation method to obtain a heat-resistant oxide.

According to the alkoxide method, for example, a mixed alkoxide solution containing alkoxide (a zirconium material and a coordinative element material) (hereinafter referred to as "alkoxides of the respective elements") of the above-described respective elements excluding noble metals such as Rh, Pt and Pd is prepared so as to establish the same stoichiometric ratio of the respective elements as in the coprecipitation method. The mixed alkoxide solution is precipitated on hydrolysis by adding water, and the resulting precipitate is dried and heat-treated (primarily baked) to obtain powders containing a zirconia material and a coordinative element material. Then, a solution containing salts of a noble metal is mixed in the powders and the noble metal is supported by the powders to obtain a precursor composition. The resulting precursor composition is then heat treated (secondarily baked) to obtain a heat-resistant oxide.

Examples of the alkoxides of the respective elements are alcoholates each comprising the respective elements and an alkoxy such as methoxy, ethoxy, propoxy, isopropoxy or butoxy; and alkoxyalcoholates of the respective elements represented by the following general formula (2):

$$E[OCH(R^1)\text{---}(CH_2)_i\text{---}OR^2]_j \qquad (2)$$

wherein E represents the respective element; $R^1$ represents a hydrogen atom or an alkyl group having 1 to 4 carbon atoms; $R^2$ represents an alkyl group having 1 to 4 carbon atoms; i represents an integer of 1 to 3; j represents an integer of 2 to 4.

More specific examples of the alkoxyalcoholates are methoxyethylate, methoxypropylate, methoxybutylate, ethoxyethylate, ethoxypropylate, propoxyethylate and butoxyethylate.

The mixed alkoxide solution can be prepared, for example, by adding alkoxides of the respective elements to an organic solvent so as to establish the above-mentioned stoichiometric ratio and mixing them with stirring. The organic solvent is not specifically limited as long as it can dissolve the alkoxides of the respective elements. Examples of such organic solvents are aromatic hydrocarbons, aliphatic hydrocarbons, alcohols, ketones, and esters, of which aromatic hydrocarbons such as benzene, toluene and xylenes are preferred.

The mixed alkoxide solution is precipitated by adding water to form a precipitate. Then, the organic solvent is distilled off from the mixed alkoxide solution to prepare an aqueous slurry solution.

An aqueous slurry solution can be prepared by distilling off the organic solvent from the mixed alkoxide solution by a vacuum drying or normal pressure drying method.

The resulting aqueous slurry solution is dried by vacuum drying or forced-air drying and then subjected to a heat treatment (primary baking), for example, at a temperature of 300° C. to 1,200° C., preferably 650° C. to 1,100° C., and more preferably 800° C. to 1,000° C., for 1 to 48 hours to obtain powders containing a zirconia material and a coordinative element material.

Then, a noble metal salt solution is added to powders containing a zirconia material and a coordinative element material and the solution is mixed by the same procedure as in the coprecipitation method, thereby impregnating the powders with the solution while supporting salts of noble metals (a noble metal material) to obtain a precursor composition.

The resulting precursor composition is subjected to a heat treatment (secondary baking) by the same procedure as in the coprecipitation method to obtain a heat-resistant oxide.

Alternatively in the alkoxide method, for example, a mixed alkoxide solution containing alkoxides of the respective elements is prepared so as to establish the same stoichiometric ratio of the respective elements as in the procedure of the coprecipitation method. The mixed alkoxide solution is precipitated on hydrolysis by adding an aqueous solution containing a salt of noble metals such as Rh, Pt and Pd to obtain a precursor composition. The resulting precursor composition is then dried and heat treated to obtain also a heat-resistant oxide.

Examples of the aqueous solution containing salts of noble metals including Rh, Pt and Pd are aqueous nitrate solution, aqueous chloride solution, aqueous hexaammine chloride solution, aqueous dinitrodiammine nitrate solution, aqueous hexachloro acid hydrate solution and aqueous potassium cyanide salt solution.

Furthermore, in the alkoxide method, for example, the mixed alkoxide solution is mixed with a solution containing organometallic salts of noble metals including Rh, Pt and Pd to prepare a uniform mixed solution, and the resulting mixed solution is precipitated by adding water to obtain a precursor composition. Then, a heat-resistant oxide can also be obtained by drying the resulting precursor composition, followed by a heat treatment.

Examples of the organic metal salt of the noble metal such as Rh, Pt and Pd are carboxylates of the above noble metals formed from acetates and propionates; β-diketone compounds or β-ketoester compounds represented by the following general formula (3) and/or metal chelate complexes of the above noble metals formed from β-dicarboxylate ester compounds represented by the following general formula (4):

$$R^3COCHR^5COR^4 \quad (3)$$

wherein $R^3$ represents an alkyl group having 1 to 6 carbon atoms or a fluoroalkyl having 1 to 6 carbon atoms or aryl group; $R^4$ represents an alkyl group having 1 to 6 carbon atoms, a fluoroalkyl group having 1 to 6 carbon atoms, an aryl group or an alkoxy group having 1 to 4 carbon atoms; and $R^5$ represents a hydrogen atom or an alkyl group having 1 to 4 carbon atoms, and

$$R^7CH(COOR^6)_2 \quad (4)$$

wherein $R^6$ represents an alkyl group having 1 to 6 carbon atoms; and $R^7$ represents a hydrogen atom or an alkyl group having 1 to 4 carbon atoms.

In the general formula (3) and the general formula (4), examples of the alkyl group having 1 to 6 carbon atoms represented by $R^3$, $R^4$ and $R^6$ are methyl, ethyl, propyl, isopropyl, n-butyl, s-butyl, t-butyl, t-amyl and t-hexyl. Examples of the alkyl group having 1 to 4 carbon atoms represented by $R^5$ and $R^7$ are methyl, ethyl, propyl, isopropyl, n-butyl, s-butyl, t-butyl. In the general formula (3), examples of the fluoroalkyl group having 1 to 6 carbon atoms represented by $R^3$ and $R^4$ include trifluoromethyl. Examples of the aryl group represented by $R^3$ and $R^4$ include phenyl. Examples of the alkoxy group having 1 to 4 carbon atoms represented by $R^4$ are methoxy, ethoxy, propoxy, isopropoxy, n-butoxy, s-butoxy and t-butoxy.

More specific examples of the β-diketone compounds are 2,4-pentanedione, 2,4-hexanedione, 2,2-dimethyl-3,5-hexanedione, 1-phenyl-1,3-butanedione, 1-trifluoromethyl-1,3-butanedione, hexafluoroacetylacetone, 1,3-diphenyl-1,3-propanedione and dipivaloylmethane.

More specific examples of the β-ketoester compounds are methylacetoacetate, ethylacetoacetate and t-butylacetoacetate.

More specific examples of the β-dicarboxylate ester compounds are dimethyl malonate and diethyl malonate.

The above-described solution containing organometallic salts of noble metals including Rh, Pt and Pd is mixed in the mixed alkoxide solution with stirring to prepare a homogeneous mixed solution, and then water is added to the homogeneous mixed solution to form a precipitate to obtain a precursor composition.

The resulting precursor composition is heat treated by the same procedure as in the coprecipitation method to obtain a heat-resistant oxide.

According to the above heat treatment (secondary baking), the noble metal is dissolved in a crystal structure to form a solid solution and a rate of a solid solution within the above range is attained. As a result of this, a heat-resistant oxide having excellent heat resistance and durability at high temperature can be obtained.

The heat-resistant oxide of the present invention thus obtained shows a high rate of a solid solution of the noble metal in the heat-resistant oxide as 50% or more. In the crystal structure, such a noble metal is dissolved to form a solid solution and the noble metal constituting the solid solution is precipitated from the crystal structure under a reducing atmosphere and is dissolved again to form a solid solution in the crystal structure under an oxidative atmosphere.

Consequently, even when the heat-resistant oxide of the present invention is used over a long period of time, grain growth of the noble metal is effectively suppressed by such a self-regenerative function capable of repeating precipitation under a reducing atmosphere and dissolution to form a solid solution under an oxidative atmosphere, and thus the dispersion state of the noble metal is maintained. As a result, high catalytic activity can be realized over a long period of time even if the amount of the noble metal is drastically decreased.

Therefore, the heat-resistant oxide of the present invention can be widely used as a reaction catalyst for a vapor phase or a liquid phase. When the heat-resistant oxide is used as a catalyst composition, it may be appropriately used as it is or used together with other components according to objects and applications. The applications are not specifically limited and the heat-resistant oxide can be widely used in the field where noble metals such as Rh, Pt and Pd are used as a catalyst. Examples thereof include a coupling reaction catalyst for organic synthesis, a reductive reaction catalyst, a hydrogenation reaction catalyst, a hydrogenolysis reaction catalyst, or an exhaust gas purifying catalyst for internal combustion engines.

In particular, when used as the exhaust gas purifying catalyst for internal combustion engines, excellent catalytic activity can be maintained for a long period through a self-regenerative function of the noble metal, and thus excellent exhaust gas purifying performances can be realized. Examples of the exhaust gas purifying catalyst for internal combustion engines include automobile exhaust gas purifying catalyst.

When the heat-resistant oxide of the present invention is used as an exhaust gas purifying catalyst, it is generally prepared in an appropriate form by a known method such as being supported on a catalyst carrier.

The catalyst carrier includes, for example, known catalyst carriers such as honeycomb monolithic carrier comprising cordierite or the like are used.

To support the heat-resistant oxide on the catalyst carrier, water is added to the heat-resistant oxide of the present invention to obtain a slurry, which is then coated onto the catalyst carrier and dried, and then heat treated at a temperature of 300° C. to 800° C., and preferably 300° C. to 600° C.

In case of preparing such an exhaust gas purifying catalyst, other known catalyst components (for example, alumina supporting the noble metal, and other known composite oxides supporting the noble metal) can be appropriately used in combination with the heat-resistant oxide of the present invention.

Further, the heat-resistant oxide of the present invention can be used as it is as an exhaust gas purifying catalyst.

EXAMPLES

The present invention will be illustrated in further detail by way of the following Examples and Comparative Example, which by no means limit the scope of the present invention.

In each of the following Examples and Comparative Example, the same operation was repeated three times and triple doses of the same kind of powder were prepared, and then these are subjected to the measurement of a rate of a solid solution described hereinafter.

Example 1

(Production of $Zr_{0.928}La_{0.070}Rh_{0.002}$ Oxide)

| | |
|---|---|
| Zirconium oxychloride [$ZrOCl_2 \cdot 8H_2O$] | 29.90 g (0.0928 mol) |
| Lanthanum nitrate [$La(NO_3)_3 \cdot 6H_2O$] | 3.03 g (0.0070 mol) |

An aqueous mixed solution was prepared by charging the above components in a 500 mL round-bottomed flask, and dissolving them in 100 mL of deionized water with stirring. Then, 25.0 g of sodium carbonate was dissolved in 200 g of deionized water to prepare an aqueous alkaline solution, and the above-described aqueous mixed solution was gradually added dropwise to the aqueous alkaline solution to form a coprecipitate. After being washed with water and filtrated, the coprecipitate was dried at 80° C. in vacuum. The coprecipitate was then heat treated (primarily baked) at 800° C. for one hour to obtain a composite oxide comprising Zr and La. To the composite oxide, 0.46 g (0.02 g in terms of Rh, corresponding to 0.0002 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 100° C. for 2 hours and then heat treated (secondarily baked) at 800° C. for one hour to obtain a heat-resistant oxide comprising $Zr_{0.928}La_{0.070}Rh_{0.002}$ oxide in which 89% Rh was dissolved to form a solid solution.

Example 2

(Production of $Zr_{0.922}Y_{0.076}Rh_{0.002}$ Oxide)

| | |
|---|---|
| Zirconium ethoxyethylate [$Zr(OC_2H_4OEt)_4$] | 41.28 g (0.0922 mol) |
| Yttrium ethoxyethylate [$Y(OC_2H_4OEt)_3$] | 2.71 g (0.0076 mol) |

A mixed alkoxide solution was prepared by charging the above components in a 500 mL round-bottomed flask, and dissolving them in 200 mL of toluene with stirring. Then, the resulting mixed alkoxide solution was added dropwise in 600 mL of deionized water over about 10 minutes and hydrolyzed. Toluene and deionized water were distilled off from the hydrolyzed solution, and the solution was evaporated to dryness and subjected to forced-air drying at 60° C. for 24 hours and then heat treated (primarily baked) at 800° C. for one hour to obtain a composite oxide comprising Zr and Y. To the composite oxide, 0.46 g (0.02 g in terms of Rh, corresponding to 0.0002 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 100° C. for 2 hours and then heat treated (secondarily baked) at 800° C. for one hour to obtain a heat-resistant oxide comprising $Zr_{0.922}Y_{0.076}Rh_{0.002}$ oxide in which 88% Rh was dissolved to form a solid solution.

Example 3

(Production of $Zr_{0.881}Nd_{0.117}Rh_{0.002}$ Oxide)

| | |
|---|---|
| Zirconium oxychloride [$ZrOCl_2 \cdot 8H_2O$] | 28.39 g (0.0881 mol) |
| Neodymium nitrate [$Nd(NO_3)_3 \cdot 6H_2O$] | 5.13 g (0.0117 mol) |

An aqueous mixed solution was prepared by charging the above components in a 500 mL round-bottomed flask, and dissolving them in 100 mL of deionized water with stirring. Then, 25.0 g of sodium carbonate was dissolved in 200 g of deionized water to prepare an aqueous alkaline solution, and the above-described aqueous mixed solution was gradually added dropwise to the aqueous alkaline solution to form a coprecipitate. After being washed with water and filtrated, the coprecipitate was dried at 80° C. in vacuum. The coprecipitate was then heat treated (primarily baked) at 500° C. for 3 hours to obtain a composite oxide comprising Zr and Nd. To the composite oxide, 0.46 g (0.02 g in terms of Rh, corresponding to 0.0002 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 100° C. for 2 hours and then heat treated (secondarily baked) at 800° C. for one hour to obtain a heat-resistant oxide comprising $Zr_{0.881}Nd_{0.117}Rh_{0.002}$ oxide in which 93% Rh was dissolved to form a solid solution.

Example 4

(Production of $Zr_{0.842}La_{0.040}Nd_{0.116}Rh_{0.002}$ Oxide)

| | |
|---|---|
| Zirconium oxychloride [$ZrOCl_2 \cdot 8H_2O$] | 27.13 g (0.0842 mol) |
| Lanthanum nitrate [$La(NO_3)_3 \cdot 6H_2O$] | 1.73 g (0.0040 mol) |
| Neodymium nitrate [$Nd(NO_3)_3 \cdot 6H_2O$] | 5.08 g (0.0116 mol) |

An aqueous mixed solution was prepared by charging the above components in a 500 mL round-bottomed flask, and dissolving them in 100 mL of deionized water with stirring. Then, 25.0 g of sodium carbonate was dissolved in 200 g of deionized water to prepare an aqueous alkaline solution, and the aqueous mixed solution was gradually added dropwise to the aqueous alkaline solution to form a coprecipitate. After being washed with water and filtrated, the coprecipitate was dried at 80° C. in vacuum. The coprecipitate was then heat treated (primarily baked) at 350° C. for 3 hours to obtain a composite oxide comprising Zr, La and Nd. To the composite oxide, 0.46 g (0.02 g in terms of Rh, corresponding to 0.0002 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 100° C. for 2 hours and then heat treated (secondarily baked) at 800° C. for one hour to obtain a heat-resistant oxide comprising $Zr_{0.842}La_{0.040}Nd_{0.116}Rh_{0.002}$ oxide in which 92% Rh was dissolved to form a solid solution.

Example 5

(Production of $Zr_{0.924}La_{0.038}Sr_{0.036}Rh_{0.002}$ Oxide)

| | |
|---|---|
| Zirconium oxychloride [$ZrOCl_2 \cdot 8H_2O$] | 29.78 g (0.0924 mol) |
| Lanthanum nitrate [$La(NO_3)_3 \cdot 6H_2O$] | 1.65 g (0.0038 mol) |
| Strontium nitrate [$Sr(NO_3)_2 \cdot 4H_2O$] | 1.02 g 0.0036 mol) |

An aqueous mixed solution was prepared by charging the above components in a 500 mL round-bottomed flask, and dissolving them in 100 mL of deionized water with stirring. Then, 25.0 g of sodium carbonate was dissolved in 200 g of deionized water to prepare an aqueous alkaline solution, and the aqueous mixed solution was gradually added dropwise to the aqueous alkaline solution to form a coprecipitate. After being washed with water and filtrated, the coprecipitate was dried at 80° C. in vacuum. The coprecipitate was then heat treated (primarily baked) at 650° C. for 3 hours to obtain a composite oxide comprising Zr, La and Sr. To the composite oxide, 0.46 g (0.02 g in terms of Rh, corresponding to 0.0002 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 100° C. for 2 hours and then heat treated (secondarily baked) at 800° C. for one hour to obtain a heat-resistant oxide comprising $Zr_{0.924}La_{0.038}Sr_{0.036}Rh_{0.002}$ oxide in which 85% Rh was dissolved to form a solid solution.

Example 6

(Production of $Zr_{0.826}Ce_{0.158}La_{0.013}Rh_{0.003}$ Oxide)

| | |
|---|---|
| Zirconium oxychloride [$ZrOCl_2 \cdot 8H_2O$] | 26.62 g (0.0826 mol) |
| Cerium nitrate [$Ce(NO_3)_3 \cdot 6H_2O$] | 6.86 g (0.0158 mol) |
| Lanthanum nitrate [$La(NO_3)_3 \cdot 6H_2O$] | 0.56 g (0.0013 mol) |

An aqueous mixed solution was prepared by charging the above components in a 500 mL round-bottomed flask, and dissolving them in 100 mL of deionized water with stirring. Then, 25.0 g of sodium carbonate was dissolved in 200 g of deionized water to prepare an aqueous alkaline solution, and the aqueous mixed solution was gradually added dropwise to the aqueous alkaline solution to form a coprecipitate. After being washed with water and filtrated, the coprecipitate was dried at 80° C. in vacuum. The coprecipitate was then heat treated (primarily baked) at 800° C. for one hour to obtain a composite oxide comprising Zr, Ce and La. To the composite oxide, 0.69 g (0.03 g in terms of Rh, corresponding to 0.0003 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 100° C. for 2 hours and then heat treated (secondarily baked) at 800° C. for one hour to obtain a heat-resistant oxide comprising $Zr_{0.826}Ce_{0.158}La_{0.013}Rh_{0.003}$ oxide in which 82% Rh was dissolved to form a solid solution.

Comparative Example 1

(Production of $Rh/Zr_{0.800}Ce_{0.150}La_{0.010}Nd_{0.040}$ Oxide)

| | |
|---|---|
| Zirconium oxychloride [$ZrOCl_2 \cdot 8H_2O$] | 25.78 g (0.0800 mol) |
| Cerium nitrate [$Ce(NO_3)_3 \cdot 6H_2O$] | 6.51 g (0.0150 mol) |
| Lanthanum nitrate [$La(NO_3)_3 \cdot 6H_2O$] | 0.43 g (0.0010 mol) |
| Neodymium nitrate [$Nd(NO_3)_3 \cdot 6H_2O$] | 1.75 g (0.0040 mol) |

An aqueous mixed solution was prepared by charging the above components in a 500 mL round-bottomed flask, and dissolving them in 100 mL of deionized water with stirring. Then, 25.0 g of sodium carbonate was dissolved in 200 g of deionized water to prepare an aqueous alkaline solution, and the aqueous mixed solution was gradually added dropwise to the aqueous alkaline solution to form a coprecipitate. After being washed with water and filtrated, the coprecipitate was dried at 80° C. in vacuum. The coprecipitate was then heat treated (primarily baked) at 600° C. for 3 hours to obtain a composite oxide comprising Zr, Ce, La and Nd. To the composite oxide, 0.46 g (0.02 g in terms of Rh, corresponding to 0.002 mol) of an aqueous rhodium nitrate solution (Rh content of 4.478% by mass) was added, and then the composite oxide was impregnated with the aqueous rhodium nitrate solution by mixing with stirring for one hour to obtain a precursor composition. This precursor composition was dried at 110° C. for 12 hours and then heat treated (secondarily baked) at 350° C. for 3 hours to obtain a heat-resistant oxide comprising $Rh/Zr_{0.800}Ce_{0.150}La_{0.010}Nd_{0.040}$ oxide in which 0% Rh was dissolved to form a solid solution.

Evaluation

1. Measurement of Rate of Solid Solution

Each of triple doses of the heat resistant powders obtained in Examples 1 to 6 and Comparative Example 1 was dissolved in an aqueous 7 wt % hydrofluoric acid solution and allowed to stand at room temperature for 20 hours, and then each solution was filtered through a filter having a pore size of 0.1 μm. The amount of Rh dissolved in the filtrate was determined by ICP (inductively coupled plasma) atomic emission spectroscopy, and quantitative analysis of Rh in the residue was carried out by an XRD (X-ray diffraction)-SEM (scanning electron microscopy) analytical method. The rate of solid solution of Rh to the heat-resistant oxide was calculated from these results. In Comparative Example 1, for the purpose of completely removing the residual salt, the rate of the solid solution was measured after subjecting to a heat treatment in the air at 350° C. for 5 hours.

The measurement results are shown in Table 1.

In the above method, the residue of a fluoride was produced during dissolving each heat-resistant oxide in an aqueous 7 wt % hydrofluoric acid solution. However, since Rh constituting a solid solution in a crystal structure of the heat-resistant oxide was dissolved, the proportion of Rh constituting a solid solution in the crystal structure of the heat-resistant oxide could be determined by measuring the concentration of Rh in the solution.

2. Evaluation of Performances

1) Coating to Catalyst Carrier

Here, 100 mL of deionized water was mixed with 100 g of each heat resistant powder obtained in Examples 1 to 6 and Comparative Example 1, followed by addition of 17.5 g of zirconia sol ("NZS-30B", manufactured by Nissan Chemical Industries, Ltd.; a solid content of 30% by mass) to obtain a slurry. The slurry was coated to a catalyst carrier comprising a cordierite honeycomb having a diameter of 80 mm, a length of 95 mm and a lattice density of 400 cell/(0.025 m)$^2$.

After coating, excess slurry was removed by air blow so as to set the coating amount of the heat-resistant oxide at 200 g per 1 L of the catalyst carrier (95.4 g per one). After forced-air drying at 120° C. for 12 hours, the catalyst carrier was baked at 600° C. in the atmosphere for 3 hours to obtain monolith catalysts containing the heat-resistant oxides of Examples 1 to 6 and Comparative Example 1, respectively.

2) Endurance Test

The above monolith catalysts of Examples 1 to 6 and Comparative Example 1 produced in the "1) Coating to Catalyst Carrier" were connected to both banks of a V-type eight-cylinder engine having a displacement of 4 liters, and were subjected to an endurance test at a highest temperature in the catalyst bed of 1,000° C. with a single cycle of 900 seconds. This test was repeated for 5 hours.

One cycle of the endurance test was set as follows. From Second 0 to Second 870 (a period of 870 seconds), an amplitude of $\Delta\lambda=\pm 4\%$ ($\Delta A/F=\pm 0.6$ A/F) with 14.6 A/F at theoretical fuel-air ratio ($\lambda=1$) (A/F=air to fuel ratio) at the center was applied at a frequency of 0.6 Hz. From Second 870 to Second 900 (a period of 30 seconds), secondary air was introduced from upstream of the catalysts, and thus the catalysts were forcibly oxidized under the conditions in which $\lambda=1.25$ is attained.

3) Activity Determination

Using an in-line four-cylinder engine having a displacement of 1.5 liters, an amplitude of $\Delta\lambda=\pm 3.4\%$ ($\Delta A/F=\pm 0.5$ A/F) with theoretical fuel-air ratio ($\lambda=1$) at the center was applied at a frequency of 1 Hz, and then the purification rates of HC of the monolith catalysts after subjected to the Endurance Test (2) were determined.

The purification rates were determined by the following procedure. The mixed gas in the stoichiometric state (A/F=14.6±0.2) was supplied to the engine. While the temperature of the exhaust gas exhausted by the combustion of the mixed gas was raised at a rate of 30° C. per minute, the exhaust gas was fed to the exhaust gas purifying catalysts, and the temperature (purification temperature) (° C.) at which 50% HC in the exhaust gas is purified was measured.

The measurement results are shown in Table 1.

TABLE 1

| | Heat-resistant oxide | | Heat treatment (secondary baking) | | Rate of solid solution (%) | Purification temperature $T_{50}$ (° C.) HC |
|---|---|---|---|---|---|---|
| | Composition | Preparation method | Temperature (° C.) | Time (hours) | | |
| Example 1 | $Zr_{0.928}La_{0.070}Rh_{0.002}$ Oxide | Coprecipitation method | 800 | 1 | 89 | 221 |
| Example 2 | $Zr_{0.922}Y_{0.076}Rh_{0.002}$ Oxide | Alkoxide method | 800 | 1 | 88 | 228 |
| Example 3 | $Zr_{0.881}Nd_{0.117}Rh_{0.002}$ Oxide | Coprecipitation method | 800 | 1 | 93 | 211 |
| Example 4 | $Zr_{0.842}La_{0.040}Nd_{0.116}Rh_{0.002}$ Oxide | Coprecipitation method | 800 | 1 | 92 | 214 |
| Example 5 | $Zr_{0.924}La_{0.038}Sr_{0.036}Rh_{0.002}$ Oxide | Coprecipitation method | 800 | 1 | 85 | 234 |
| Example 6 | $Zr_{0.826}Ce_{0.158}La_{0.013}Rh_{0.003}$ Oxide | Coprecipitation method | 800 | 1 | 82 | 262 |
| Comparative Example 1 | $Rh/Zr_{0.800}Ce_{0.150}La_{0.010}Nd_{0.040}$ Oxide | Coprecipitation method | 350 | 3 | 0 | 312 |

While the illustrative embodiments of the present invention are provided in the above description, such is for illustrative purpose only and it is not to be construed restrictively. Modification and variation of the present invention which will be obvious to those skilled in the art is to be covered by the following claims.

INDUSTRIAL APPLICABILITY

The heat-resistant oxide of the present invention can be widely used in the field where noble metals such as Rh, Pt and Pd are used as a reaction catalyst for a vapor phase or a liquid phase. Therefore, the heat-resistant oxide of the present invention can be preferably used as a coupling reaction catalyst for organic synthesis, a reductive reaction catalyst, a hydrogenation reaction catalyst, a hydrogenolysis reaction catalyst, or an exhaust gas purifying catalyst for internal combustion engines. Further, the heat-resistant oxide of the present invention can be used preferably for automobile exhaust gas purifying catalyst as an exhaust gas purifying catalyst for internal combustion engines.

The invention claimed is:

1. A heat-resistant oxide, which is obtained by mixing a noble metal material containing at least one noble metal selected from the group consisting of platinum, rhodium and palladium with a zirconia material containing zirconia and a coordinative element material containing at least one coordinative element selected from the group consisting of rare earth elements, alkaline earth elements, aluminum and silicon to prepare a precursor composition containing the zirconia, the coordinative element and the noble metal and heat-treating the precursor composition at 650° C. or higher, wherein a rate of a solid solution of the noble metal in a fluorite-type oxide crystal structure comprising the zirconia, the coordinative element and the noble metal is 50% or more.

2. The heat-resistant oxide according to claim 1, which is represented by the following general formula (1):

$$Zr_{1-(x+y)}A_xN_yO_{2-z} \quad (1)$$

wherein A represents at least one coordinative element selected from the group consisting of rare earth elements, alkaline earth elements, aluminum and silicon; N represents at least one noble metal selected from the group consisting of platinum, rhodium and palladium; x represents an atomic ratio of A satisfying the following relation: $0.01<x<0.4$; y represents an atomic ratio of N satisfying the following relation: $0.0001<y<0.02$; and z represents an oxygen deficiency.

3. The heat-resistant oxide according to claim 1, wherein the rare earth element is a rare earth element whose valence does not vary from 3.

4. The heat-resistant oxide according to claim 1, wherein the rare earth element is at least one selected from the group consisting of La, Nd and Y.

5. The heat-resistant oxide according to claim 1, wherein the coordinative element is the rare earth element.

6. The heat-resistant oxide according to claim 1, wherein the coordinative element is selected from elements other than Ce.

7. The heat-resistant oxide according to claim 1, wherein the noble metal is Rh and/or Pt.

8. The heat-resistant oxide according to claim 1, wherein the noble metal is Rh.

9. The heat-resistant oxide according to claim 1, wherein the rate of the solid solution is 80% or more.

* * * * *